April 23, 1940.     E. G. BUSSE     2,197,785
RAILWAY TRUCK STRUCTURE
Filed Jan. 6, 1938     3 Sheets-Sheet 1

INVENTOR
EDWIN G. BUSSE
BY Rodney Bedell
ATTORNEY

April 23, 1940.  E. G. BUSSE  2,197,785

RAILWAY TRUCK STRUCTURE

Filed Jan. 6, 1938  3 Sheets-Sheet 2

INVENTOR
EDWIN G. BUSSE
BY Rodney Bedell
ATTORNEY

April 23, 1940.  E. G. BUSSE  2,197,785
RAILWAY TRUCK STRUCTURE
Filed Jan. 6, 1938   3 Sheets-Sheet 3

INVENTOR
EDWIN G. BUSSE
BY Rodney Bedell
ATTORNEY

Patented Apr. 23, 1940

2,197,785

UNITED STATES PATENT OFFICE 2,197,785

RAILWAY TRUCK STRUCTURE

Edwin G. Busse, Chicago, Ill., assignor to Chicago Railway Equipment Company, Chicago, Ill., a corporation of Illinois Application January 6, 1938, Serial No. 183,601

18 Claims. (Cl. 188—212)

The invention relates to railway trucks and more particularly to the structure whereby the brake beam is mounted on the truck and guided in its movements towards and from the wheels.

The usual support for the brake beam on the truck frame utilizes a swinging link, mounted on suitable hanger brackets provided on the upper portion of the frame, with its lower end received in a recess in the brake head to suspend the latter. The movement of the brake head towards the wheel may be independent of any guiding means, or guide means may be provided in the form of arms carried by the truck side frame or spring plank and slidably engaging elements on the beam to maintain the angular position of the beam and the brake shoe relative to the wheel tread.

There have been various suggestions of eliminating the swing hanger arrangement referred to by supporting the brake beam on the side frame, but, so far as I am aware, such suggestions have involved special beam structures, special spring plank arrangements, or other features which have detracted from the desirability of the structures notwithstanding the advantage of eliminating the swing hangers and associated parts.

The main object of the present invention is to support the brake beam from the side frame in a practical, economical manner and irrespective of the presence of a spring plank. There are many thousands of trucks in service utilizing the usual hanger arrangement, many of which trucks before their life is ended will require the replacement of their brake beams.

It is an additional object of the invention to provide a beam assembly adapted not only for mounting on the truck side frame in the manner described herein, but also adapted for the usual hanger mounting in the event it should be desired to apply the beam to a truck not arranged for supporting the beam direct from the side frame.

Additional objects of the invention are to properly guide the beam in its movements towards and from the wheels to avoid interference with the proper mounting of the beam because of wear of interengaging parts, and to facilitate the mounting of the beam directly on side frames which have been originally designed for the usual swing hanger mounting of the beam.

Other detailed objects of the invention will appear from the following description, reference being had to the accompanying drawings, in which—

Figures 1, 2:
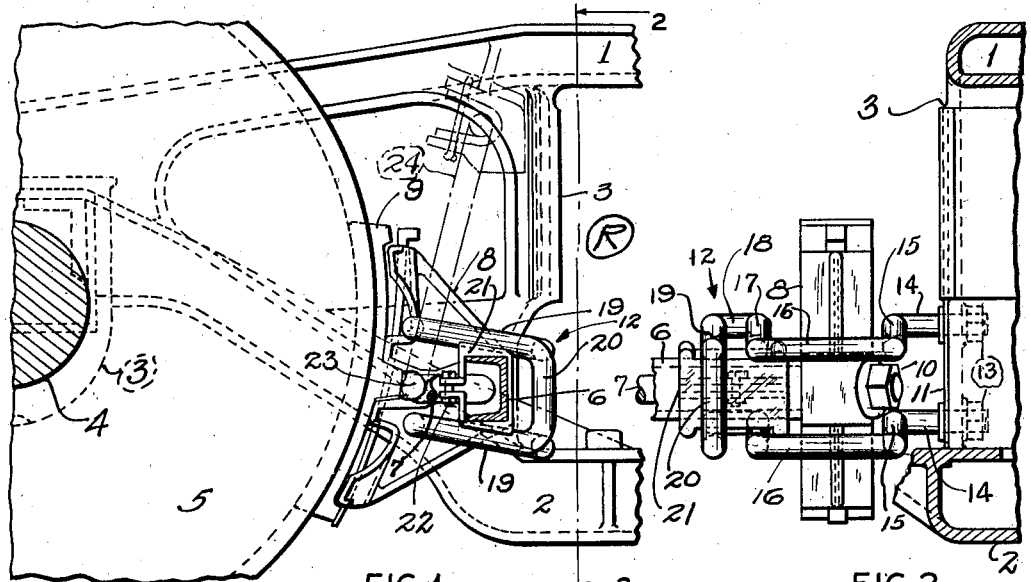
Figure 1 is a side elevation, partly in section, of a portion of the side frame of a truck with the associated journal box, wheel and brake beam structure being indicated, the same embodying one form of the invention.
Figure 2 is a vertical section taken substantially on the line 2—2 of Figure 1.
Figure 6:
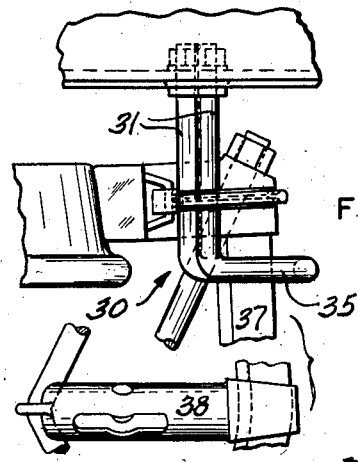
Figure 3:
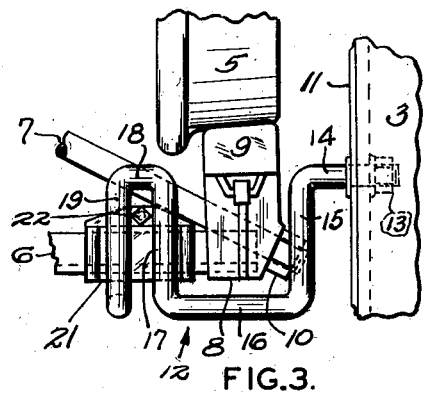
Figure 3 is a top view of one end of the brake beam and its supporting structure.
Figures 4, 5:
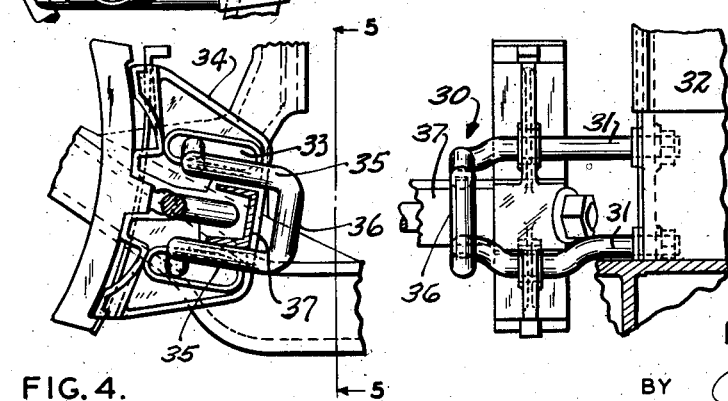
Figure 4 is a fragmentary view corresponding in part to Figure 1 but illustrating a modified form of the invention.

Figures 5 and 6 correspond to Figures 2 and 3 but illustrate the modification shown in Figure 4.

Figure 7:
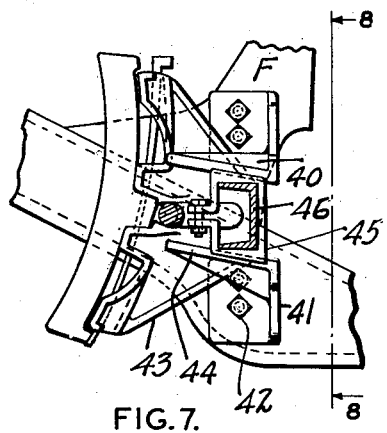
Figure 8:
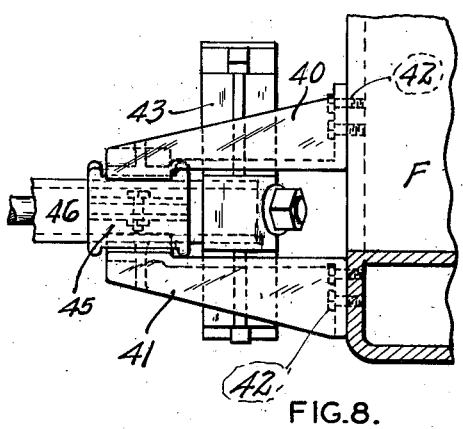
Figure 8A:
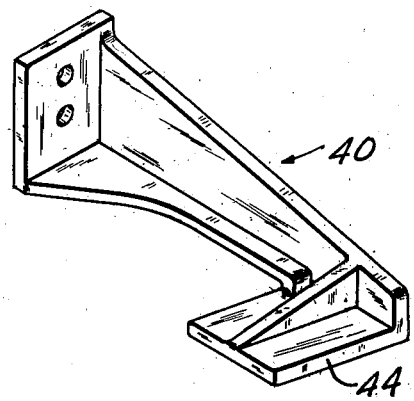

Figures 7 and 8 correspond to Figures 4 and 5 but illustrate another modification. Figure 8a is a perspective of a detail of the device.

Figure 9:
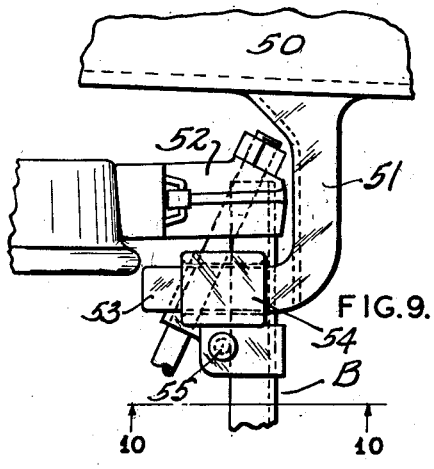
Figure 10:
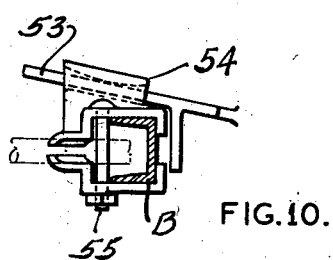

Figures 9 and 10 correspond to Figures 6 and 5 but illustrate still another modification of the invention.

Figure 11:
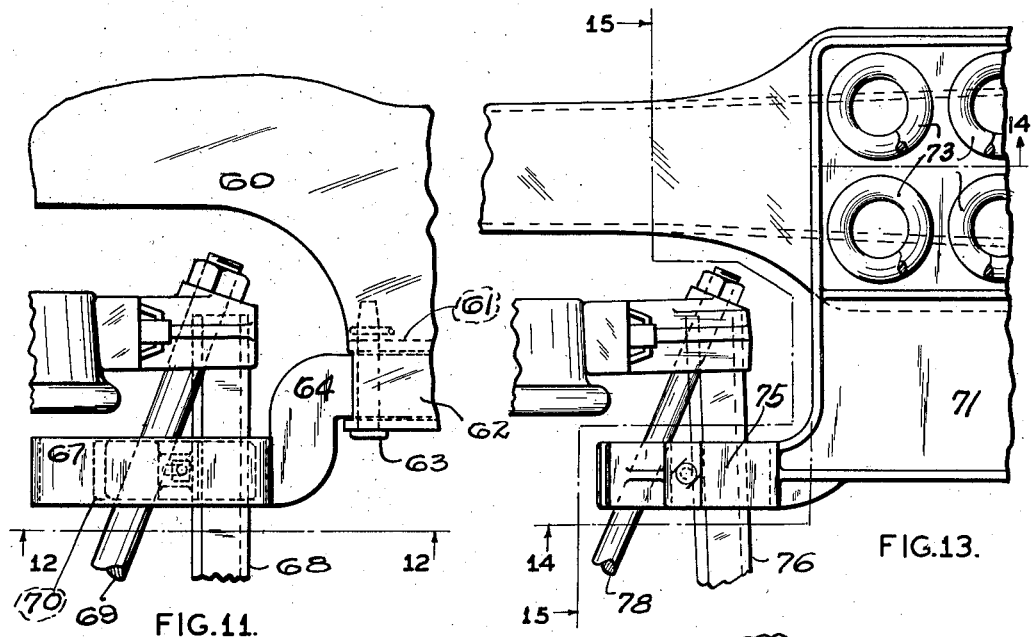
Figure 12:
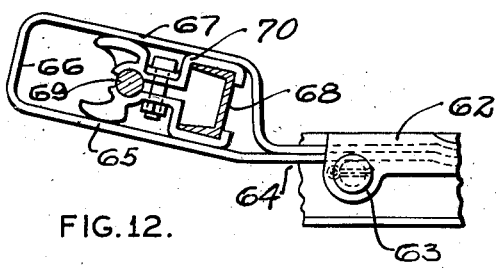

Figures 11 and 12 correspond to Figures 9 and 10 but illustrate another modification.

Figure 14:
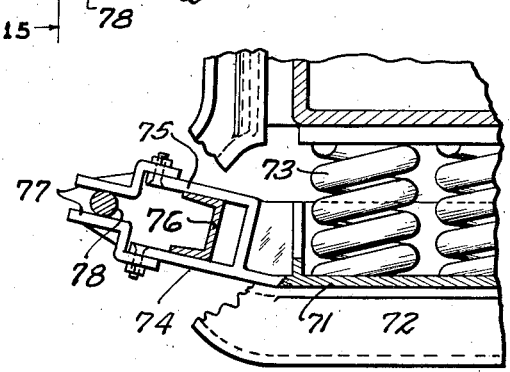
Figure 15:
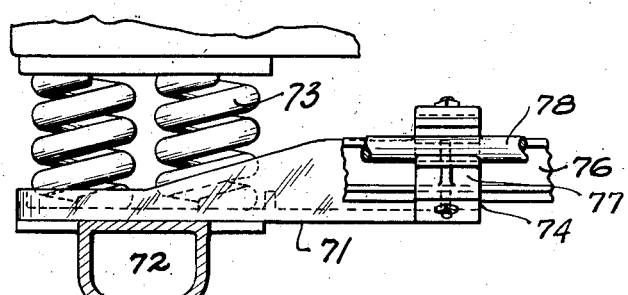

Figures 13, 14 and 15 correspond to Figures 6, 4 and 5 but illustrate a different form of the invention.

The structure shown in Figures 1 to 3 includes a truck side frame of familiar truss formation and comprises the usual major elements of a compression member 1, a tension member 2, and struts 3, the compression and tension members joining at their ends where they may include as an integral part thereof the box 3 seated on the journal 4 of the axle upon which the wheel 5 is mounted. Elements 1, 2 and 3 define the usual recess or opening R for receiving the bolster and bolster spring (not shown).

The brake beam is of the usual truss formation comprising a compression member 6, a tension member 7, a strut corresponding to that shown at 38 in Figure 5, a brake head 8, carrying the shoe 9, and a nut 10 threaded onto the end of the tension member and serving as a device whereby the parts are held in assembled relation and whereby the rigidity of the beam may be maintained, notwithstanding deformation which may occur after a period of use, and making possible the substitution of a new head or tension member in the beam.

Preferably the inside face of the side frame includes a web or rib member 11 opposite to the inner end of the beam and a beam supporting bracket 12 secured to member 11 by nuts 13. Bracket 12 is shown as a one-piece member having substantially duplicate upper and lower shouldered elements extending inwardly from the side frame at 14, then extending rearwardly of the wheel and downwardly at 15, then inwardly of the truck and behind the brake head at 16, then forwardly and upwardly at 17, then transversely of the truck at 18, then rearwardly and downwardly at 19, and then vertically at 20 to join with the corresponding end of the other element of the bracket.

One of the bracket elements extends over the top of the brake beam compression and tension members and the other bracket element extends beneath the same. A bearing 21 fits over the beam compression member 6 and is clamped in place by a bolt 22. The upper and lower faces of bearing 21 are inclined to engage the opposing faces of the bracket elements whereby the beam is supported firmly upon the frame through bracket 12 and is guided in its movements towards and from the wheel by the inclined elements 19 of the bracket.

The brake head is shown with the usual hanger receiving recess 23 and Figure 1 indicates in dot and dash lines the application of the usual hanger 24 to the brake head and to a bracket on the side frame, but it will be understood that this showing is merely to illustrate the usual arrangement and does not indicate the normal functioning of the elements of the present invention. It does indicate that the brake beam of the usual truss form and arranged for the usual hanger is adapted for mounting directly on the side frame by means of the bracket and bearing members illustrated.

Figures 4, 5 and 6 illustrate a modification in which the bracket 30 includes upper and lower elements 31 extending inwardly from the side frame 32 directly through elongated slots 33 provided therefor in the brake head 34 to a point nearer the center of the truck than the brake head and then extending rearwardly of the wheel and downwardly, as at 35, to terminate in upright portions 36 merging with the other element. The brake beam compression member 37 is tilted from a horizontal position and rests upon lower element 35 of the bracket and the latter cooperates with lower element 31 to support the beam directly from the side frame.

In the structures described above, each of the brackets consists of a single length of rod bent to the necessary configuration for supporting and guiding the beam and having its ends shouldered and threaded for securing to the side frame.

Figures 7 and 8 illustrate a modification in which the upper and lower bracket elements 40 and 41 are separate from each other and are individually secured to the side frame F by bolts or rivets 42, and each extending inwardly from the side frame at the rear of the brake head 43 and terminating in a forwardly and upwardly inclined leg 44 cooperating with a bearing 45 on the brake beam compression member 46 corresponding to the bearing 21 shown in Figures 1 to 3.

In Figures 9 and 10 the side frame 50 has a single integral arm 51 extending inwardly of the truck at the rear of the brake beam B and brake head 52, the arm terminating in a forwardly and upwardly inclined rib 53 extending between the upper and lower ears of a bearing 54 clamped to the compression and tension members of the beam by the bolt 55.

In Figures 11 and 12, the lower central portion of the side frame 60 has an inwardly facing pad or rib 61 to which is attached a bracket member 62 having depending legs for receiving a pin 63.

A brake beam support member 64 is gripped between the upper web of the bracket 62 and the pin 63 and extends beyond the end of the bracket longitudinally of the frame upwardly and forwardly, as indicated at 65, and then vertically, as at 66, where it is doubled on itself at 67 and extends back to the bracket 62. The widely spaced elements 65 and 67 receive between them the brake beam compression and tension members 68 and 69 and a bearing device 70 attached thereto and having upwardly and downwardly facing surfaces for engagement with the bracket elements 65 and 67.

Figures 13, 14 and 15 comprise a bracket member 71 resting upon the lower central portion 72 of the side frame and seating the truck springs 73 and extending inwardly therefrom at the rear of the brake beam and terminating in forwardly and upwardly inclined spaced arms 74 and 75 disposed to receive between them the upper and lower flanges of the beam compression member 76. Separate terminals 77 are secured to forward ends of arms 74 and 75 and are offset inwardly to contact the tension member 78 of the beam. This arrangement eliminates the provision of a separate bearing as previously described although the terminals of the bracket member must be detachably secured to the bracket to provide for assembly with the beam.

In Figures 1, 7 and 10 the brake beam is shown lying in a general plane parallel with the rail although the supporting brackets cause the beam to be moved on an upward incline as the brakes are applied. In Figures 4, 12 and 14, the brake beam itself is set with the front higher than the back so that the center line of the strut runs to the center of the axle. Both arrangements of the brake beam are used in practice, and it will be understood that any of the constructions is adapted for either angular disposition of the beam.

The continuous round bar formation of the bracket shown in Figures 1 to 5 is not essential and the details of all the brackets may be modified substantially to meet different conditions.

In all forms of the invention illustrated and described there is a bracket secured direct to the side frame and extending inwardly of the truck beyond the brake head and then transversely of the beam to support and guide the latter in its movement towards and from the wheels. In each instance the upper portion of the beam engaging bracket prevents the bouncing of the beam from its support and contributes to the guiding movement by resisting any turning movement of the beam about its longitudinal axis.

In each form of the invention a standard A. A. R. truss type brake beam can be used including a brake head having the usual recess for the brake hanger, and in all forms of the invention, except that shown in Figures 4 and 5, the brake head can be a standard A. A. R. type without any change whatever. It will be understood that each of the brake beams includes the brake head, which is illustrated in some of the drawings only. This brake head is adapted to receive the usual brake hanger and therefore to be used in the ordinary truck structure as well as in trucks arranged for the "hangerless" brake beam support described.

The invention is not limited to the above mentioned embodiments as other types of brake beams may be used and also other supporting arrangements. My application Serial No. 183,602 filed of

What is claimed is:

1. In a railway spring-plankless truck, a side frame, a brake beam having a head at the end thereof, and a device detachably mounted on said frame independently of the remaining truck structure at a point on said frame opposite to the end of said beam and extending from said frame inwardly of the truck and engaging said beam inwardly of said head to normally support and guide the beam and head in their movement to and from the wheel.

2. In a spring-plankless truck, side frames, wheels, a truss type brake beam comprising a compression member, brake heads, a tension member, a strut between said members, and devices on the ends of said tension member for taking up slack in the beam, opposing elements carried by each of said side frames independently of other truck structure and facing upwardly and downwardly, respectively, and extending inwardly from said side frame, and cooperating structure on said beam at the sides of said heads opposite to said devices and engaging said elements for supporting and guiding said beam during the application and release of the brake.

3. In a spring-plankless truck, side frames, wheels, a truss type brake beam comprising a compression member, brake heads, a tension member, a strut between said members, and devices on the ends of said tension member for taking up slack in the beam, opposing elements carried by each of said side frames independently of other truck structure and facing upwardly and downwardly, respectively, and extending inwardly from said side frame, and cooperating structure on said beam at the sides of said heads opposite said devices and engaging said elements for supporting and guiding said beam during the application and release of the brake.

4. In a railway truck, an axle and wheels, a side frame having a web facing inwardly of the truck, a brake beam terminating short of said web and including a brake head, there being a bracket extending from a point on said web opposite to the end of said beam inwardly of the truck and around said brake head and then engaging said beam to support and guide the same in its movement to and from said wheels.

5. In a railway truck, an axle and wheels, a side frame having a web facing inwardly of the truck, a brake beam terminating short of said web and including a brake head, there being a bracket extending from said web inwardly of the truck and including elements above the top of said beam and below the bottom of said beam, respectively, both inclined from the vertical longitudinally of the truck to engage said beam inwardly of said head to guide the same in its movement towards and from said wheels.

6. A truck structure as set forth in claim 5 in which the lower of the bracket elements forms the main support for the beam.

7. In a railway truck, a wheel, a brake beam extending transversely of the truck and including the usual head, a side frame, and a bracket structure extending inwardly from said frame and then lengthwise of the truck above and below said beam and at the side of said head facing inwardly of the truck and inclined to the vertical lengthwise of said truck and to support said beam and hold the same in predetermined angular relation to said wheel.

8. In a railway truck, a wheel, a brake beam extending transversely of the truck and including the usual head, a side frame, a pair of vertically spaced bracket elements secured to said frame and extending downwardly and away from said wheel lengthwise of the truck and beneath and above said beam, respectively, and at the side of said head facing inwardly of the truck to support and guide said beam in its movements to and from said wheel.

9. In a railway truck, a wheel, a side frame, a brake beam, a bracket on said side frame extending inwardly of the truck past the end of said beam and terminating in a rib inclined lengthwise of the truck, there being cooperating interengaging elements on said rib and beam for supporting the latter independently of other carrying elements and maintaining its angular relation to the wheel.

10. In a railway truck, a wheel, a side frame, a brake beam, a bracket on said side frame extending inwardly of the truck past the end of said beam and terminating in a rib inclined lengthwise of the truck and extending over said beam, a bearing member secured to said beam and having vertically spaced elements engaging the upper and lower sides of said rib to support and guide said beam in its movement to and from the wheel.

11. In a railway truck, a wheel, a side frame, a brake beam having a head movable to and from said wheel, said head having elongated slots extending longitudinally of the truck, a bracket on said frame extending inwardly of the truck and through said brake head slots and supporting said beam.

12. In a railway truck, a wheel, a side frame, a brake beam having a head movable to and from said wheel, said head having elongated slots extending longitudinally of the truck, a bracket on said frame extending inwardly of the truck and through said brake head slots and then supporting said beam at a point spaced from said head inwardly of the truck.

13. In a railway truck, a side frame, a truss type brake beam, a bracket structure on said side frame extending inwardly of the truck past the end of said beam and then forwardly transversely of said beam, and a bearing member extending between and connected to the compression and tension members of said beam and engaging said bracket structure.

14. A bracket structure for application to the side frame of a railway truck and comprising vertically spaced elements with attaching portions adapted to pass through the side frame and for mounting securing nuts, there being extensions on said elements disposed at an angle to said attaching portions and adapted to receive a brake beam between them to support and guide the latter at a point spaced substantially from said attaching portions, and being united adjacent said point to hold the adjacent parts in spaced relation.

15. A bracket structure as specified in claim 14 consisting of a one-piece continuous bar bent to the configuration described.

16. A bracket structure for application to the side frame of a railway truck and comprising a part for attachment to the side frame and a portion spaced from said part for engaging a brake beam at a point spaced from its end, said bracket being recessed between said part and portion to clear a brake head mounted on the end of the beam.

17. In a railway spring-plankless truck, a side frame, a brake beam having a head at the end thereof, and a device detachably mounted on said frame and extending from said frame to underlie and overlie a portion of said beam at the side of said head facing inwardly of the truck to normally support and guide the beam and head in their movement to and from the wheel.

18. In a railway spring-plankless truck, side frames, a device carried by each of said side frames and extending therefrom inwardly of the truck and then longitudinally of the truck, and a brake beam stably supported solely by said devices and maintained thereby in desired angular relation to the truck wheels during the application and release of braking forces.

EDWIN G. BUSSE.